2,789,878
PROTACTINIUM EXTRACTION PROCESS

Donald F. Peppard, Oak Park, Ill., assignor to the United States of America as represented by the United States Atomic Energy Commission No Drawing. Application December 23, 1952,
Serial No. 327,650

15 Claims. (Cl. 23—14.5)

This invention relates to the recovery of protactinium from aqueous solutions, and more particularly to a solvent extraction process for the separation of protactinium from other substances contained in aqueous solutions. The process is particularly useful for the recovery of protactinium from the waste raffinates in uranium recovery processes and from similarly composed solutions. The waste raffinates are the aqueous solutions obtained after solvent extraction of the bulk of uranium from nitric acid-containing solutions of uranium ores, such as pitchblende; these remaining solutions contain the non-extracted part of uranium, thorium, protactinium, rare earths, iron and perhaps some other contaminants.

The separation of the various isotopes of protactinium from metal values such as the separation of $Pa^{231}$ from neutron-irradiated ionium ($Th^{230}$), part of which has been converted by ($n$, $\gamma$) reaction to $Th^{231}$ which decays by negative beta emission to $Pa^{231}$, is of considerable importance because protactinium occurs in nature only in very minute amounts and then only in the relatively scarce uranium-containing ores. Since naturally occurring protactinium, $Pa^{231}$, is the decay product of a relatively short-lived thorium isotope, which is formed by decay of certain long-lived uranium isotopes, the relative abundance of protactinium in natural ores is substantially less than that of naturally occurring uranium.

It is an object of this invention to provide a process for the separation of protactinium values from thorium and/or uranium values contained in aqueous solutions.

A further object of the instant invention is to provide a process for the selective separation of the aforementioned values from their solution in an organic solvent.

Other objects and advantages of the present invention will become apparent upon the examination of the disclosure set forth hereinafter.

The process of this invention is based on selective solvent extraction which is achieved carrying the various steps out under very specific conditions as will be set forth later.

The particular type of organic solvent employed in the process of this invention is a solvent of the alkyl phosphate type wherein the total number of carbon atoms is preferably at least 12 because those with less carbon atoms are usually water-miscible. By alkyl phosphate is meant a compound wherein at least one hydrogen in phosphoric acid is substituted by an alkyl radical and the remaining hydrogen atoms in phosphoric acid can be either an alkyl radical or a hydrogen atom. Examples of suitable alkyl phosphates are tributyl phosphate, trioctyl phosphate, dioctyl hydrogen phosphate, octadecyl dihydrogen phosphate, and trihexyl phosphate. Other phosphates include trialkoxyalkyl phosphates and trialkyl phosphine oxides.

Since the alkyl phosphate-type solvents are often viscous liquids with a high specific gravity which makes phase separation difficult, it is desirable, especially in column operations, to admix a less viscous diluent to the alkyl phosphate. Since some of the elements possibly present in the aqueous solution to be treated give off beta and/or gamma irradiation, it is further desirable that the diluent as well as the solvent be radiation-stable. The solvent and diluent used, moreover, must be substantially nonvolatile at room temperature and have a specific gravity either substantially greater or less than that of water, preferably less than 0.8 or greater than 1.2. For greater safety in operation, both the solvent and diluent should have flash points higher than 35° C.

Suitable diluents, for instance, are hexane, n-heptane, octane, alkanes having 12–14 carbon atoms, methylcyclohexane, and the polyethers.

The preferred diluents for the alkyl phosphate-type solvents are the halogenated, and especially chlorine- or fluorine-substituted, hydrocarbons. Suitable halogen-substituted hydrocarbons which are normally liquid at operating temperatures are chloroform, trichloroethylene, ethylene dichloride, orthodichlorobenzene and carbon tetrachloride, non-aromatics being the preferred diluent of this type, because it was found that the extraction of metal values varies inversely with the aromatic content of the solvent mixture. Although the halogen-substituted liquid hydrocarbons are preferred which contain only one single type of halogen, such as carbon tetrachloride, liquid halogenated hydrocarbons containing two different halogens are satisfactory; for example, the various "Freon" compounds, such as dichlorodifluoromethane and 1-dichlorofluoro-2-chlorodifluoroethane, are excellent.

The solvent extraction of protactinium with alkyl phosphate has to be carried out from acid solutions and it is largely dependent upon the acid concentration present. Monobasic acids are the most satisfactory ones, and hydrochloric acid is preferred.

The presence of a salting-out agent in the aqueous solution also improves extraction of the protactinium values. The salting-out agent preferably is a water-soluble salt having the same anion as the acid in the aqueous solution and the metal salt to be extracted; it should also be a salt which does not complex protactinium. Especially suitable salting-out agents for the instant process are the nitrates and chlorides of ammonium, aluminum, magnesium, manganese and calcium. In addition to these added salts, hydrochloric acid or nitric acid and the thorium nitrate or thorium chloride present in the aqueous solution also function as salting-out agents. At a constant nitric acid concentration, the protactinium extraction increases linearly with increasing concentration of aluminum nitrate up to 0.5 and 0.6 M. Otherwise the extraction of protactinium with alkyl phosphate varies directly with the total concentration of both the acid anion and the hydrogen ion in the aqueous phase, which concentration may range from 0.1 to 20 M. Acidities in excess of 2 M, however, are preferred in the aqueous solution to be extracted in order to preclude substantial hydrolysis of the protactinium compound to a solvent-insoluble, and thus non-extractable, compound.

The distribution ratio (organic/aqueous) for protactinium extracted, for instance, by tributyl phosphate from an aqueous 5 M hydrochloric acid solution, is approximately 20, whereas from a 11.8 M HCl-containing aqueous solution the distribution ratio for protactinium is greater than $2 \times 10^3$. Thus, in a hydrochloric acid system, a two fold increase in acidity increases the extraction of protactinium by a factor of 1000.

It has now been found that at high levels of acidity, such as 11.8 M HCl and above, at which the distribution ratio for protactinium in the organic solvent phase is large, uranium, if also present in the aqueous solution, is extracted to a degree of approximately the same order as that for protactinium while at acid concentrations in the aqueous system lower than about 11.8 M, e. g. at about 5 M, the distribution ratio for uranium in the organic phase is only about 40.

A sharp separation of both protactinium and uranium from thorium can be effected by extraction with tributyl phosphate from an aqueous 5 M HCl solution. Under these conditions the distribution ratio (organic/aqueous) thorium is $6 \times 10^{-3}$, the distribution ratio for protactinium (organic/aqueous) is 20 and for uranium is 40. At higher acidities, for example at 11.8 M HCl, the distribution ratio (organic/aqueous) for the extraction of thorium in tributyl phosphate is 5. Protactinium can be extracted from aqueous solutions which have a lower or a higher acidity.

Similar experiments were carried out using tributyl phosphate which was not pre-equilibrated. The aqueous solutions were 6 M in $NH_4Cl$ and 0.4 M in HCl. The distribution ratios (organic/aqueous) for thorium, protactinium and uranium were 0.01, 0.9 and 4, respectively. These data, when compared with previously given data using 5 M HCl, indicate that considerably better separation of protactinium and/or uranium from thorium can be accomplished by using HCl as the sole salting-out agent.

It has also been found that separation of protactinium from uranium by solvent extraction with an alkyl phosphate can be effected by adding, prior to extraction, fluoride anions to the aqueous solution of protactinium and uranium which has a relatively high acid concentration, e. g. of 5 M. The fluoride, which is suitably added in a quantity to yield a concentration of at least about 0.25 M HF, complexes the protactinium and thus substantially decreases its distribution ratio (organic/aqueous) while the uranium extraction from such a fluoride-containing solution remains unaffected. For example, extraction of an aqueous protactinium- and uranium-containing solution 5 M in HCl and 0.5 M in HF yielded a distribution ratio of protactinium (organic/aqueous) of 0.1 only as compared with 20 when no fluoride was present and a distribution ratio of 40 for the uranium which is identical with that obtained when no fluoride was present.

In solutions containing fluoride anions which complex protactinium and thereby make protactinium preferentially soluble in the aqueous phase, extraction of protactinium values with an organic solvent from such a solution requires that the complexing action of the fluoride anion be overcome. This is suitably effected by introducing, for example, an aluminum salt; aluminum has a stronger affinity for fluoride ions than has protactinium so that the protactinium is brought back to its uncomplexed, extractable form. Where the ratio between the aluminum concentration and that of fluoride anion is about 3:1, the extraction of protactinium increases gradually with aluminum nitrate concentrations ranging from 0.6 to 1.1 M in the aqueous phase. At aluminum nitrate concentrations of above 1.2 M the extraction of protactinium remains fairly constant with increasing aluminum nitrate concentration.

Uranium and protactinium which have been coextracted in alkyl phosphate can furthermore be separated from each other according to this invention by selective back extraction of the protactinium values. For this purpose the organic extract phase containing the uranium and protactinium is contacted with an aqueous solution, for example about 5 M in HCl and 0.5 M in HF; the protactinium is complexed and taken up by the aqueous solution while the uranium remains in the alkyl phosphate. The uranium contained in the organic solvent can be readily recovered by back extraction with water.

Thorium, if present in the original aqueous solution, is coextracted with the protactinium in an alkyl phosphate by the process of this invention to a small degree only; this small proportion of extracted thorium can be separated from the solvent extract phase containing it together with protactinium and uranium values by contacting said solvent extract with an aqueous scrub 5 M in HCl, thereby selectively back extracting thorium into the aqueous phase and leaving protactinium and uranium in the organic extract phase. Thereafter the protactinium is back extracted with $F^-$-containing aqueous solution 5 M in HCl as described above.

The invention also comprises the selective separation of protactinium values, thorium values, and uranium values contained in an alkyl phosphate solution. Extraction of all three of these values is accomplished by providing an acidity of above 6 M, but preferably of above 11.8 M. In this instance separation may be accomplished by first contacting the alkyl phosphate solution with an aqueous 5 M hydrochloric acid solution, whereby thorium is extracted into the aqueous phase; thereafter contacting the thorium-depleted alkyl phosphate phase with an aqueous solution 5 M in HCl and 0.5 M in HF whereby protactinium is extracted into the aqueous solution, and finally removing the uranium from the alkyl phosphate by contacting the latter with water.

Another possibility of separating thorium, protactinium and uranium values from alkyl phosphate solutions comprises adding to said organic solution an aqueous 0.25 to 2 M hydrofluoric acid solution containing a salting-out agent; thorium is thereby precipitated as thorium tetrafluoride and protactinium at the same time complexed a preferentially aqueous-soluble form. Thus protactinium is taken up by an aqueous phase, thorium is precipitated while uranium remains in the alkyl phosphate; separation of these three phases accomplished isolation of the three substances in one single process phase.

The invention is further illustrated by the following examples.

*Example 1*

Fifteen ml. of an aqueous protactinium ($Pa^{233}$) solution were acidified with 1 ml. concentrated nitric acid, and 26.7 g. of ammonium nitrate, $NH_4NO_3$, were added thereto. The resultant solution had a final volume of 32.5 ml. A 3-ml. portion of this latter solution was introduced into a 12-ml. graduated centrifuge tube containing 3 ml. of tributyl phosphate; the content of the tube was stirred for 15 minutes and then permitted to settle for three minutes. The content of the tube was divided in 2.8 ml. of an organic phase and 3.2 ml. of an aqueous phase; the aqueous phase was removed and found to contain 570 beta-counts/min. The remaining organic phase was scrubbed with 3.2 ml. of an aqueous 10 N ammonium nitrate solution, stirred for 15 minutes and allowed to settle for three minutes. The aqueous scrub was separated from the organic phase and found to contain 220 beta-counts/min., while the scrubbed tributyl phosphate phase contained 17,400 beta-counts/min. These findings indicate a Pa-distribution ratio (organic/aqueous) of 31 in the initial extraction and of 79 for the scrub treatment.

The following data demonstrate the wide range of acidity over which extraction of protactinium with an alkyl phosphate solvent is operable.

A 1-ml. portion of concentrated (about 16 M) nitric acid solution containing $1.82 \times 10^5$ c./min./ml. (first shelf) of $Pa^{233}$ was contacted for 10 minutes with 1 ml. of tributyl phosphate. Analysis by counting the resultant aqueous phase showed that 97% of the protactinium had been extracted by the alkyl phosphate to give a distribution ratio (organic/aqueous) of 32.

Three ml. of the aforementioned initial tracer solution of $Pa^{233}$ in 16 M $HNO_3$ were diluted with water to 8 ml. of a solution about 6 M in nitric acid and emitting $6.8 \times 10^4$ c./min./ml. A 1-ml. aliquot of this 6 M $HNO_3$ solution was contacted for 10 minutes with 1 ml. of tributyl phosphate, and a count of the aqueous raffinate therefrom showed $6.2 \times 10^3$ c./min./ml., indicating 90.9% extraction of protactinium therefrom or a protactinium distribution ratio (organic/aqueous) of 10.

It has also been found that, while contacting an alkyl phosphate solution containing both protactinium and uranium values with an aqueous solution 5 M in HCl and 0.5 M in HF results in a selective extraction of the protactinium into the aqueous solution, the uranium can be extracted from the tributyl phosphate by contact with an aqueous solution weak in hydrochloric acid but relatively strong in hydrofluoric acid. For instance, an aqueous solution 0.5 M in HCl and 1 M in HF, when contacted with uranium-containing alkyl phosphate, yielded a uranium distribution ratio (organic/aqueous) of 0.004. The uranium can also be extracted with water instead of the HCl-HF mixture, but then a greater number of extraction stages are necessary. This finding was utilized in the experiment of Example II.

*Example II*

A three-step extraction was carried out from an aqueous solution in three cylindrical separatory funnels each of which contained 15 ml. of tributyl phosphate that had been equilibrated with 5 M HCl. The solution to be extracted was obtained from an aqueous solution that contained 50 micrograms of $Pa^{231}$ emitting $2.7 \times 10^6$ alpha-counts per minute, $Pa^{233}$ emitting $6 \times 10^6$ beta-counts per minute (first shelf 5 mg. Al), $U^{233}$ emitting $2.5 \times 10^6$ alpha-counts per minute, and 5 mg. of $Th^{230}$ emitting $1.1 \times 10^8$ alpha-counts per minute; this solution, before extraction, was evaporated several times to near dryness with hydrochloric acid, and the dry residue was thereafter dissolved in concentrated hydrochloric acid and diluted to a total volume of 15 ml. of a solution 5 M in hydrochloric acid. The "feed" thus prepared was then shaken with the tributyl phosphate in the first separatory funnel for 10 minutes and allowed to settle for three minutes; the resultant aqueous phase was transferred to and contacted with the tributyl phosphate in the second funnel; again the aqueous phase was separated and contacted as described with the tributyl phosphate in the third funnel.

The first tributyl phosphate fraction was then scrubbed with 15 ml. of an aqueous solution 5 M in HCl and the aqueous phase used for scrubbing the second tributyl phosphate fraction, and again the aqueous phase of the second organic fraction, was used for scrubbing the third tributyl phosphate fraction. This procedure will be designated hereinafter, for the sake of simplicity, as "successive cycling." Three separate 15-ml. portions of aqueous 5 M HCl were "successively cycled" through the tributyl phosphate fractions. Thereafter, five 15-ml. portions of an aqueous scrub 5 M in HCl and 0.5 M in HF, and finally four 15-ml. portions of an aqueous scrub 0.5 M in HCl and 1 M in HF were successively cycled. The feed and the various aqueous effluents from the third funnel were numbered consecutively as solutions 1 through 13. Each of these effluents 2–13 was plated for alpha- and beta-count analysis to determine the respective protactinium, thorium, and uranium contents. The following results were obtained: Solution 1 (aqueous raffinate) contained 85% of the thorium. Solution 2 (the effluent after the first scrub) contained 14% of the thorium present, solution 3 the other 11% of the thorium, while solution 4 was thorium-free. Solutions 5 through 9 contained 64%, 24%, about 7%, about 3% and about 2%, respectively, of the protactinium initially present. Solution 10 then was found to contain 24% of the uranium initially present, solution 11 70% of the uranium, solution 12 6%, and solution 13 0% uranium.

*Example III*

A by-product aqueous waste solution which had been obtained from the processing of pitchblende for the recovery of uranium and which contained traces of protactinium, thorium, uranium and polonium was used; the protactinium concentration was 97 micrograms per liter emitting $5 \times 10^4$ counts/min./microgram. 300 ml. of this solution were mixed with 200 g. $Al(NO_3)_3 \cdot 9H_2O$, and the mixture was shaken for 10 minutes in contact with 40 ml. tributyl phosphate and then allowed to settle for 3 minutes. The mixture was transferred to a separatory funnel and again allowed to settle for 1 minute; the phases were separated. The aqueous phase was extracted with an additional 40 ml. of tributyl phosphate. The extract phase formed was separated and combined with the solvent extract fraction previously obtained. The combined solvent phases were thereafter re-extracted by adding 15 ml. of an aqueous 2 M solution of HF and shaking for 3 minutes; the mixture was then centrifuged for 5 minutes whereby three separate fractions were obtained, namely the 80 ml. of the combined tributyl phosphate extracts which emitted $1.84 \times 10^4$ c./min./ml. or a total of $1.47 \times 10^6$ c./min. which proved to be derived from the polonium; a second fraction, a precipitate of thorium tetrafluoride and an aqueous raffinate as the third fraction. The precipitate was scrubbed with an additional 7 ml. of an aqueous solution 2 M in HF, and this scrub solution was then combined with the 15 ml. of aqueous raffinate obtained. These 22 ml. of aqueous solution were mixed with 35 g. of $Al(NO_3)_3 \cdot 9H_2O$ and shaken for 15 minutes in contact with 20 ml. of diisopropyl carbinol. The mixture was allowed to settle for 5 minutes and then transferred to a separatory funnel for phase separation. Twenty-two ml. of an organic solvent extract phase were thereby recovered; it was found to emit $5.0 \times 10^4$ c./min./ml. or a total of $1.1 \times 10^6$ c./min., 90% of which were derived from $Pa^{231}$. This represents a protactinium recovery of about 68% of that initially present in the waste solution.

It will be understood that this invention is not to be limited to the details given herein but that it may be modified within the scope of the appended claims.

What is claimed is:

1. A process of separating thorium values from protactinium values and uranium values, comprising providing an aqueous phase containing hydrochloric acid in a concentration of less than 6 M and an alkyl phosphate phase, one of said phases initially containing said thorium, protactinium and uranium values dissolved; contacting said two phases whereafter said protactinium values and uranium values are preferentially contained in said alkyl phosphate phase while said thorium values are preferentially contained in said aqueous phase; and separating said two phases.

2. A process of separating thorium values from protactinium values and uranium values contained in an aqueous solution, comprising providing a hydrochloric acid content in said solution of less than 6 M; contacting said solution with a substantially water-immiscible alkyl phosphate whereby a protactinium- and uranium-containing alkyl phosphate phase and a thorium-containing aqueous phase are formed; and separating said two phases.

3. The process of claim 2 wherein the alkyl phosphate is tributyl phosphate.

4. A process of separating thorium values from protactinium values contained in an aqueous solution, comprising providing a hydrchloric acid content in said soluton of less than 6 M; contacting said solution with a substantially water-immiscible alkyl phosphate whereby a protactinium-containing alkyl phosphate phase and a thorium-containing aqueous phase are formed; and separating said two phases.

5. The process of claim 4 wherein the alkyl phosphate is tributyl phosphate.

6. A process of separating protactinium values from uranium values, comprising providing an aqueous phase containing hydrochloric acid in a concentration of from 2 M to 11.8 M and hydrofluoric acid in a concentration of at least 0.25 M and an alkyl phosphate phase, one of said phases initially containing said protactinium and uranium values dissolved; contacting said two phases whereafter said uranium values are preferentially contained in said alkyl phosphate phase while said protactinium values are preferentially contained in said aqueous phase; and separating said two phases.

7. The process of claim 6 wherein an aluminum salt is added and dissolved in said protactinium-containing separated aqueous phase and the aqueous solution obtained thereby is then contacted with an alkyl phosphate whereby said protactinium values are taken up by said alkyl phosphate, and the alkyl phosphate is finally separated from the aqueous solution.

8. A process for separating protactinium values from thorium and uranium values contained in an aqueous solution, comprising providing in said aqueous solution a hydrochloric acid concentration of at least 6 M; contacting said aqueous solution with a substantially water-immiscible alkyl phosphate whereby said protactinium, thorium and uranium values are taken up by an alkyl phosphate phase; isolating said alkyl phosphate phase; contacting said alkyl phosphate phase with an aqueous solution less than 6 M in hydrochloric acid and at least 0.25 M in hydrofluoric acid whereby said protactinium values are taken up by said hydrochloric acid solution, while said uranium values remain in said alkyl phosphate phase; and separating said alkyl phosphate phase from said hydrochloric acid solution.

9. The process of claim 8 wherein the concentration of hydrochloric acid of at least 6 M is about 1.8 M.

10. A process of separating protactinium values and uranium values contained in an aqueous solution, comprising providing a hydrochloric acid content of at least 6 M in said aqueous solution; contacting said aqueous solution with a substantially water-immiscible alkyl phosphate whereby said thorium, protactinium and uranium values are taken up by an alkyl phosphate phase; separating said alkyl phosphate phase from an aqueous phase; contacting said alkyl phosphate phase with an aqueous chloride solution containing at least 0.25 M hydrofluoric acid whereby an aqueous protactinium-containing phase forms while said uranium values remain in said alkyl phosphate phase; and separating said aqueous phase and said alkyl phosphate phase from each other.

11. The process of claim 10 wherein the alkyl phosphate is tributyl phosphate.

12. A process of separating protactinium values from uranium values contained in aqueous solution, comprising providing a hydrochloric acid content of less than 6 M and a hydrofluoric acid content of at least 0.25 M in said solution, contacting said solution with a substantially water-immiscible alkyl phosphate whereby a uranium-containing alkyl phosphate phase and a protactinium-containing aqueous phase are formed, and separating said two phases.

13. The process of claim 12 wherein the alkyl phosphate is tributyl phosphate.

14. A process of separating thorium values, protactinium values, and uranium values dissolved in a substantially water-immiscible alkyl phosphate, comprising contacting said alkyl phosphate with an aqueous chloride solution containing hydrofluoric acid in a concentration of at least 0.25 M whereby a precipitate of thorium fluoride and an aqueous protactinium-containing phase form while said uranium values remain in said alkyl phosphate; and separating said precipitate, said aqueous phase and said alkyl phosphate from each other.

15. The process of claim 14 wherein the alkyl phosphate is tributyl phosphate.

No references cited.

U. S. DEPARTMENT OF COMMERCE
PATENT OFFICE

CERTIFICATE OF CORRECTION

Patent No. 2,789,878     Donald F. Peppard     April 23, 1957

It is hereby certified that error appears in the printed specification of the above numbered patent requiring correction and that the said Letters Patent should read as corrected below.

Column 1, line 51, after "achieved" insert --by--; column 2, line 69, for "phase in" read --phase is--; column 4, line 28, after "complexed" insert --to--; column 7, line 29, for "1.8 M" read --11.8 M--.

Signed and sealed this 1st day of July 1958.

(SEAL)
Attest:
KARL H. AXLINE
Attesting Officer

ROBERT C. WATSON
Commissioner of Patents